United States Patent
McArthy

(10) Patent No.: US 9,943,935 B2
(45) Date of Patent: Apr. 17, 2018

(54) METHOD OF MAKING A VALVE STEM SEAL WITH FORMABLE RETAINER TABS

(71) Applicant: Dana Automotive Systems Group, LLC, Maumee, OH (US)

(72) Inventor: Troy D. McArthy, Huntertown, IN (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 139 days.

(21) Appl. No.: 15/093,796

(22) Filed: Apr. 8, 2016

(65) Prior Publication Data

US 2017/0291268 A1    Oct. 12, 2017

(51) Int. Cl.
*B29C 33/30* (2006.01)
*B23P 15/00* (2006.01)
(Continued)

(52) U.S. Cl.
CPC .......... *B23P 15/002* (2013.01); *B29C 33/305* (2013.01); *F01L 3/04* (2013.01); *F01L 3/08* (2013.01); *F16J 15/3252* (2013.01); *F16J 15/3276* (2013.01); *F16K 41/04* (2013.01); *B29K 2021/00* (2013.01);
(Continued)

(58) Field of Classification Search
CPC ... B23P 15/002; F16J 15/3252; F16J 15/3276; B29C 33/305; F16K 41/04; F01L 3/04; F01L 3/08; F01L 2103/01; B29L 2031/7506; B29L 2031/26; B29K 2905/00; B29K 2021/00
See application file for complete search history.

(56) References Cited

U.S. PATENT DOCUMENTS 940,143 A    11/1909  Foltz
2,157,866 A    5/1939  Robertson et al.
(Continued)

FOREIGN PATENT DOCUMENTS

| EP | 2884061 A1 | 6/2015 |
| JP | H09126323 A | 5/1997 |
| JP | 2017025934 A | 2/2017 |

OTHER PUBLICATIONS

Machine-generated English Translation of JPH09126323, obtained via Espacenet Patent Search.
(Continued)

*Primary Examiner* — Richard Chang
(74) *Attorney, Agent, or Firm* — Marshall & Melhorn, LLC

(57) ABSTRACT

A method for making a valve stem seal, comprising the steps of providing a metal retainer having a top portion and a body portion. The body portion having a first section and a second section. In a first state, the first section of the body portion is cylindrical and the second section of the body portion is cone shaped. Providing a hollow mold. Inserting the metal retainer into the outer mold piece, inserting the inner mold piece into the metal retainer, and then securing the inner and outer mold pieces to each other. Filling a cavity around the top portion of the metal retainer with an elastomeric compound. Removing the metal retainer and the formed rubber sealing element from the mold pieces, and pressing downward over the formed valve stem seal to compress the second section of the body portion radially inwardly.

10 Claims, 3 Drawing Sheets

(51) Int. Cl.
*F01L 3/04* (2006.01)
*F01L 3/08* (2006.01)
*F16K 41/04* (2006.01)
*F16J 15/3252* (2016.01)
*F16J 15/3276* (2016.01)
*B29K 21/00* (2006.01)
*B29L 31/26* (2006.01)
*B29L 31/00* (2006.01)

(52) U.S. Cl.
CPC ....... *B29K 2905/00* (2013.01); *B29L 2031/26* (2013.01); *B29L 2031/7506* (2013.01); *F01L 2103/01* (2013.01)

(56) References Cited

U.S. PATENT DOCUMENTS

| | | | |
|---|---|---|---|
| 2,157,867 A | 5/1939 | Robertson et al. | |
| 2,237,758 A | 4/1941 | Kurtzwell | |
| 2,822,796 A | 2/1958 | Niess | |
| 3,498,621 A | 3/1970 | Wilson | |
| 4,773,363 A | 9/1988 | Stritzke | |
| 4,909,202 A | 3/1990 | Binford et al. | |
| 5,553,869 A * | 9/1996 | Stamback | F01L 3/08 123/188.6 |
| 6,227,548 B1 | 5/2001 | Netzer | |
| 6,609,700 B2 | 8/2003 | Leimer | |
| 6,764,079 B1 | 7/2004 | Hegemier et al. | |
| 6,901,902 B1 * | 6/2005 | Butcher | F16K 41/08 123/188.6 |
| 8,668,203 B2 * | 3/2014 | Sakata | F01L 3/08 277/502 |
| 9,052,018 B2 * | 6/2015 | Hegemier | F01L 3/08 |
| 9,371,749 B2 * | 6/2016 | Hegemier | F01L 3/08 |
| 2013/0200574 A1 | 8/2013 | Hegemier et al. | |
| 2015/0167850 A1 * | 6/2015 | Zoppi | F16K 1/46 251/214 |

OTHER PUBLICATIONS

Machine-generated English Translation of JP2017025934, obtained via Espacenet Patent Search.
International Search Report and Written Opinion for Application No. PCT/US2017/021629, dated Jun. 28, 2017).

* cited by examiner

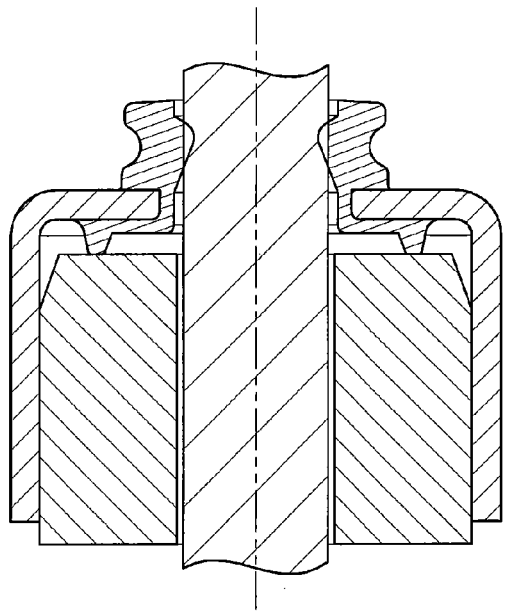
**FIG. 1
(PRIOR ART)**
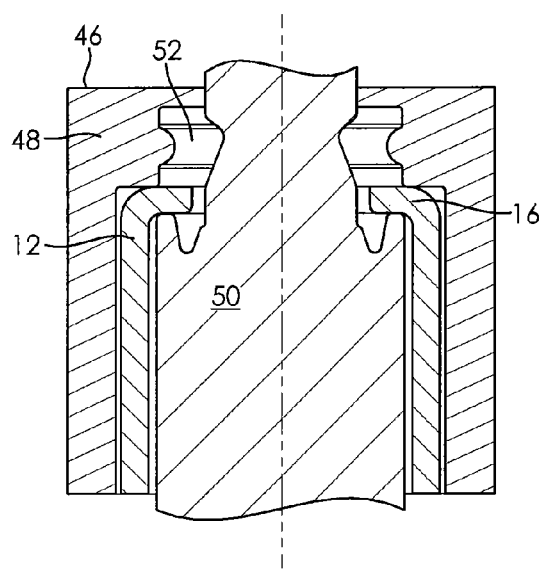 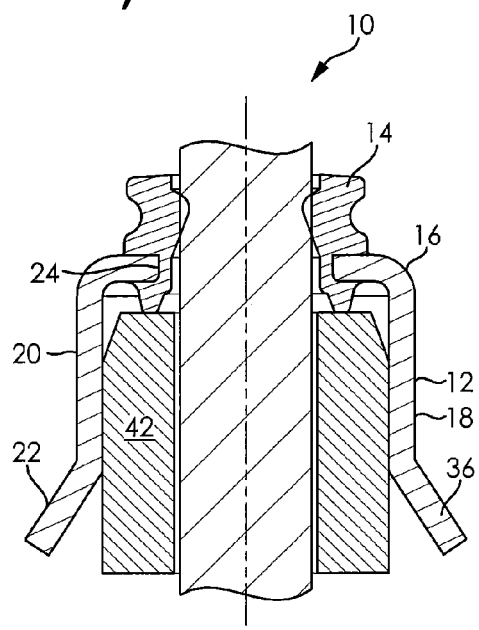
FIG. 2  FIG. 3

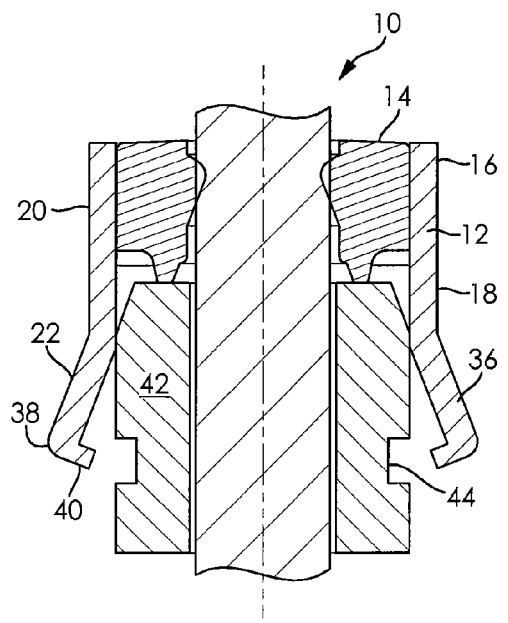
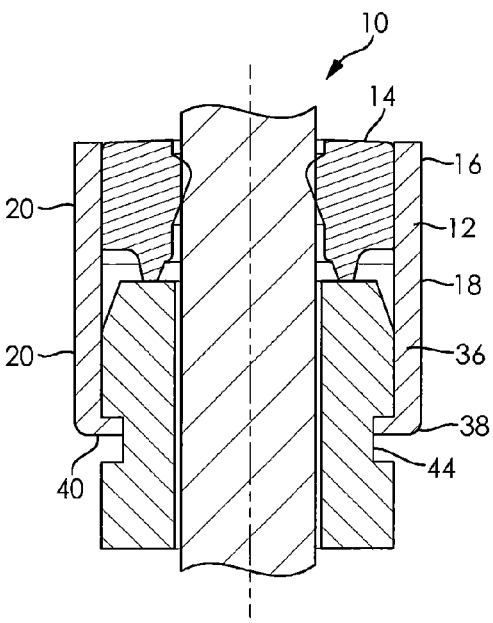
FIG. 8    FIG. 9
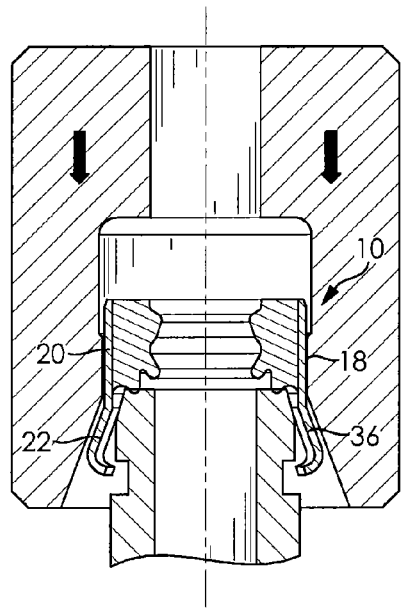
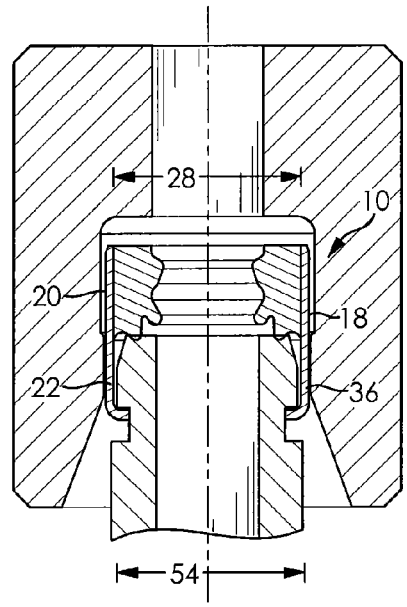
FIG. 10    FIG. 11

US 9,943,935 B2

METHOD OF MAKING A VALVE STEM SEAL WITH FORMABLE RETAINER TABS

FIELD OF THE INVENTION

A valve stem seal retainer assembly as used in internal combustion engines. More particularly, a metal retainer with formable tabs utilized during assembly of a valve stem seal is described.

BACKGROUND OF THE INVENTION

Those skilled in the art will appreciate the manner in which intake and exhaust valves are employed in cylinder heads of internal combustion engines. Such valves, supported for reciprocal motion within valve guides, typically include integral elongated stems extending away from the engine cylinder heads, the ends of the stems interacting with rotating overhead cams for cyclic or repeated opening and closure of the valves against the force of valve return springs during the combustion cycle. Obviously, in order to permit unobstructed reciprocal movement of the stem in the guide, some mechanical clearance must exist between the valve guide and the moving stem. A plurality of valve stems thus move reciprocally to and from the cylinder head, each within its individual guide, and so-called valve stem seal assemblies are used to seal against leakage of oil through a mechanical clearance path between each annular engine valve guide and its associated valve stem.

In the typical engine, a valve stem seal assembly is fitted over or atop each valve guide, wherein each seal assembly includes a retainer frictionally mounted to an associated valve guide. Each valve stem seal assembly normally has two primary parts: 1) an elastomeric oil seal for controlling leakage of oil between the valve stem and guide as noted, and 2) a structural cylindrical retainer mounted atop of the valve guide to hold the oil seal in place.

Much progress has been achieved in valve stem seal design, performance, and construction. In some instances, there is a horizontal limit that constrains when or if typical seal designs can be made. In the molding process, the mold needs vertical access to a metal retainer surface to "shut-off" the rubber flow. In some designs it is desired to have a lower metal diameter smaller than this would normally allow. This usually applies when valve guides are thin, providing little room for rubber. Adapting seal designs to accommodate the diameter limitations would result in a more costly valve stem seal assembly. In view of the described limitations it would be desirable to have a formable metal retainer that could eliminate size limitations of current seal designs, while also reducing the costs to manufacture a valve stem seal assembly to meet these specifications.

SUMMARY

A method for making a valve stem seal, comprising the steps of providing a metal retainer having a top portion and a body portion. The body portion having a first section and a second section. In a first state, the first section of the body portion is cylindrical and the second section of the body portion is cone shaped. Next, providing a hollow mold cavity created from an outer mold piece and an inner mold piece. The outer mold piece has a hollow interior and the inner mold piece is solid. Inserting the metal retainer into the hollow interior of the outer mold piece, and then inserting the inner solid mold piece into the metal retainer. The inner and outer mold pieces are then secured to each other. Filling a cavity around the top portion of the metal retainer with an elastomeric compound. Next removing the metal retainer and the formed rubber sealing element from the mold pieces, and pressing downward over the formed valve stem seal to compress the second section of the body portion radially inwardly. In a second state, the first section of the body portion is cylindrical and the second section of the body portion is cylindrical.

BRIEF DESCRIPTION OF THE FIGURES

FIG. 1 is a cross sectional side view of a prior art valve stem seal;

FIG. 2 is a cross sectional side view of one embodiment of a metal retainer in a mold;

FIG. 3 is a cross sectional side view of one embodiment of the invention in a first state;

FIG. 8 is a cross sectional side view of another embodiment of the invention in a first state;

FIG. 9 is a cross sectional side view of FIG. 8 in a second state;

FIG. 10 is a cross sectional side view of another embodiment of the invention viewed prior to the pressing downward step; and FIG. 11 is a cross sectional side view of FIG. 10 after the pressing downward step.

DESCRIPTION OF PREFERRED EMBODIMENTS

Figure 4:
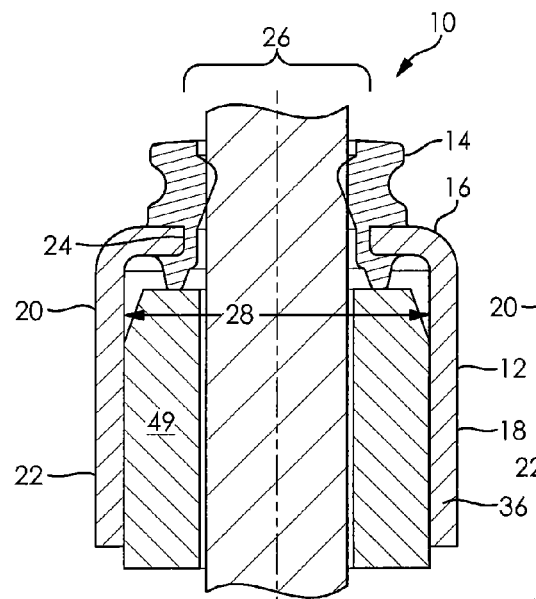
FIG. 4 is a cross sectional side view of FIG. 3 in a second state.

It is to be understood that the invention may assume various alternative orientations and step sequences, except where expressly specified to the contrary. It is also to be understood that the specific assemblies, articles and features illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise. Also, although they may not be, like elements in various embodiments may be commonly referred to with like reference numerals within this section of the application.

FIG. 3 depicts a valve stem seal 10 that is similar to the valve stem seal depicted in prior art FIG. 1. The prior art valve stem seal shown in the figure is not conducive for use with the thinner valve guides. By using a formable metal retainer, as described in the application, size limitations of the seal shown in the prior art figure are eliminated.

The valve stem seal 10, as shown in FIG. 3, comprises a metal retainer 12 and a rubber sealing element 14. The metal retainer 12 has a top portion 16 and a body portion 18. The body portion 18 has a first section 20 and a second section 22. The top portion 16 and the body portion 18 are unitary and one piece. The top portion 16 and body portion 18 define a through passageway.

Figure 5:
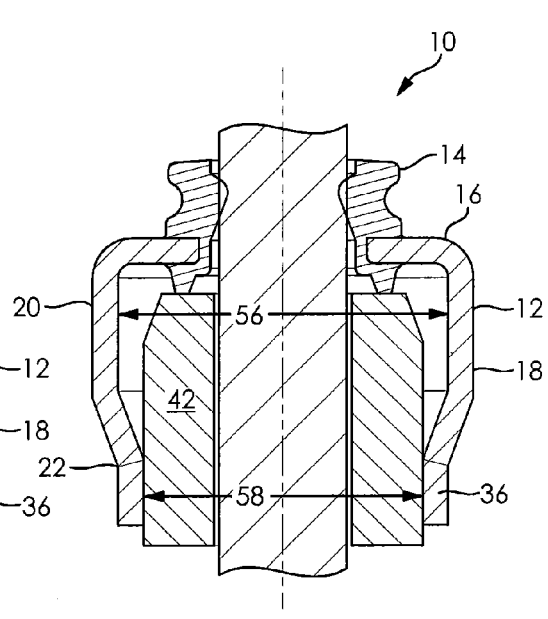
FIG. 5 is a cross sectional side view of another embodiment of the invention in a second state.

The top portion 16 may have a radially inwardly extending flange 24, so that an inner diameter 26 of the top portion 16 is less than an inner diameter 28 of the first section 20 of the body portion 18. In this embodiment as shown in FIGS. 3, 4 and 5, the top portion 16 is perpendicular to the body portion 18 and contacts the rubber sealing element 14. The top portion 16 may be horizontally molded into the side of the rubber sealing element 14. It is also within the scope of the invention for the top portion 16 to be flush with a top 30 of the rubber sealing element 14.

Figure 6:
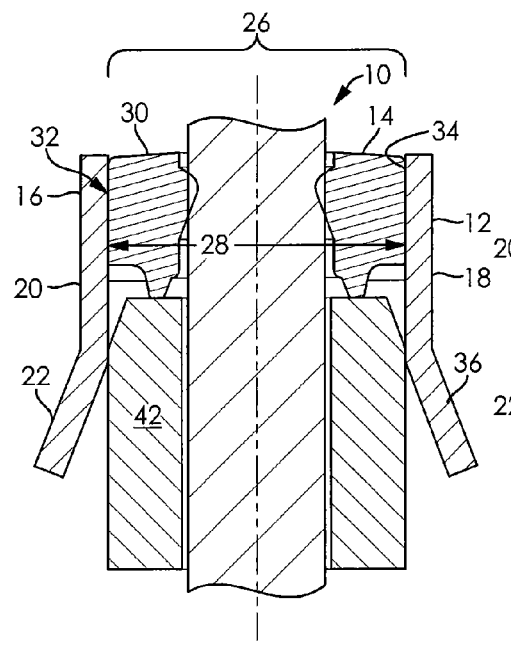
FIG. 6 is a cross sectional side view of another embodiment of the invention in a first state.
Figure 7:
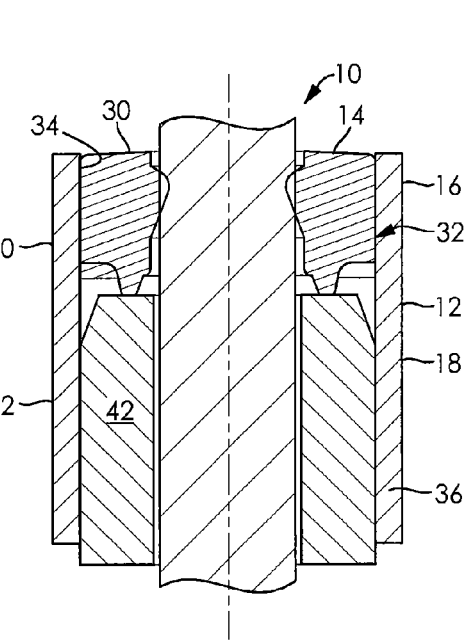
FIG. 7 is a cross sectional side view of FIG. 6 in a second state.

In this embodiment as shown in FIGS. 6 and 7, the top portion 16 is parallel to and in alignment with the body portion 18 and contacts the rubber sealing element 14. An inner surface 32 of the top portion 16 contacts an exterior surface 34 of the rubber sealing element 14. As shown in the figure, an inner diameter 26 of the top portion 16 is equal to an inner diameter 28 of the first section 20 of the body portion 18.

As shown in FIGS. 3-9, the first section 20 of the body portion 18 is adjacent to the top portion 16 of the metal retainer 12. The first section 20 of the body portion 18 transitions directly into the second section 22 of the body portion 18. The second section 22 is directly below the first section 20 and has vertical legs or tabs 36. The tabs 36 are equidistance from one another and are formable so that they may be moved during or after the molding process.

In a first state, as shown in FIGS. 3, 6 and 8, the first section 20 of the body portion 18 is cylindrical and the second section 22 of the body portion 18 is cone shaped. In this state as shown in the figures, the tabs 36 are extended outwardly so as to appear cone shaped. The tabs 36 are formable so they can be extended outwardly during the molding process. This is advantageous because it allows an inner mold piece 50 vertical movement. If the tabs 36 were not formable, the mold core would not be able to move vertically, which could affect the flow of an elastomeric compound that forms the seal.

In another embodiment as shown in FIGS. 8 and 9, an end 38 of each vertical tab 36 has an inwardly extending flange 40. This particular feature is useful for valve guides 42 that have a groove 44. The inwardly extending flanges 40 are inserted into the groove 44 on the valve guide 42 and assist in holding the valve stem seal 10 securely in place.

The valve stem seal 10 seals and grips a metal valve guide 42 with two distinctive and different surfaces. The first utilizes the elastomeric characteristics of the rubber sealing element 14 to form a rubber to metal seal, and the second utilizes the metal retainer 12 to grip the metal valve guide 42.

A hollow mold 46 is used during the molding process which forms the rubber sealing element 14 portion of the valve stem seal 10. The hollow mold 46 is created from an outer mold piece 48 and an inner mold piece 50. The outer mold piece 48 has a hollow interior and the inner mold piece 50 is solid, as shown in FIG. 2.

The metal retainer 12 is inserted into the hollow interior of the outer mold piece 48, and then the inner mold piece 50 is inserted into the metal retainer 12 in the hollow interior of the outer mold piece 48. The inner and outer mold pieces 48, 50 are then secured or mechanically affixed to each other for form the mold 46.

A cavity 52 is formed between the inner mold piece 50 and the outer mold piece 48 around the top portion 16 of the metal retainer 12. The elastomeric compound is used to fill the cavity 52. The inner mold piece 50 is used to cut off the flow of elastomeric compound creating a defined shape for the rubber sealing element 14. The elastomeric compound fills the cavity 52 and forms the rubber sealing element 14. The rubber sealing element 14 is affixed to the metal retainer 12, and the metal retainer 12 helps to support and hold the rubber sealing element 14 in place. After the molding process is complete, the metal retainer 12 with the affixed molded rubber sealing element 14 are removed from the mold pieces 48, 50.

The next step, as shown in FIGS. 10 and 11, involves pressing downward over the formed valve stem seal 10 to compress the vertical tabs 36 of the second section 22 of the body portion 18 radially inwardly. In a first state, as shown in FIG. 10, the first section 20 of the body portion 18 is cylindrical and the second section 22 of the body portion 18 is cone shaped. After pressing downward, this second state as shown in FIG. 11, the first section 20 of the body portion 18 is cylindrical and the second section 22 of the body portion 18 is now also cylindrical. In the second state as shown, the first section 20 of the body portion 18 and the second section 22 of the body portion 18 are parallel to and in alignment with one another. An inner diameter 28 of the first section 20 of the body portion 18 is substantially equal to an inner diameter 54 of the second section 22 of the body portion 18.

In another embodiment, as shown in FIG. 5, the second section 22 of the body portion 18 is compressed inwardly past vertical with respect to the first section 20 of the body portion 18. In this embodiment, an inner diameter 56 of the first section 20 of the body portion 18 is greater than an inner diameter 58 of the second section 22 of the body portion 18.

The valve stem seal 10 as described in the invention is particularly beneficial for use on "thin" valve guides, and allows for a smaller diameter of the metal retainer 12. The formable tabs 36 of the metal retainer 12 can also accommodate greater valve guide outer diameter tolerances than the prior art design allows. The radial clamping force of the formable tabs 36 can also provide improved retention force to hold the rubber sealing element 14 onto the valve guide 42. The optional inwardly extending flanges 40, at the end of the formable tabs 36, can also greatly increase the rubber sealing element 14 to valve guide 42 retention form. This can be especially beneficial to turbocharged engines that tend to blow the rubber sealing element 14 off of the valve guide 42 due to excess force and pressure.

From the foregoing detailed description, it will be apparent that various modifications, additions, and other alternative embodiments are possible without departing from the true scope and spirit. The embodiments discussed herein were chosen and described to provide the best illustration of the principles of the invention and its practical application to thereby enable one of ordinary skill in the art to use the invention in various embodiments and with various modifications as are suited to the particular use contemplated. As should be appreciated, all such modifications and variations are within the scope of the invention.

What is claimed is:

1. A method for making a valve stem seal, comprising the steps of:

providing a metal retainer comprising a top portion and a body portion, said body portion comprising a first section and a second section, wherein in a first state, said first section of said body portion is cylindrical and said second section of said body portion is cone shaped, said metal retainer top portion and body portion defining a through passageway;

providing a hollow mold cavity created from an outer mold piece and an inner mold piece, wherein said outer mold piece has a hollow interior and said inner mold piece is solid;

inserting said metal retainer into said hollow interior of said outer mold piece;

inserting said inner mold piece into said metal retainer in said hollow interior of said outer mold piece and securing said outer mold piece with said inner mold piece;

filling a first cavity around said top portion of said metal retainer with an elastomeric compound;

removing said metal retainer and a formed rubber sealing element from said mold pieces; and pressing downward over said formed valve stem seal to compress said second section of said body portion radially inwardly, wherein in a second state said first section of said body portion is cylindrical and said second section of said body portion is cylindrical.

2. The method of making a valve stem seal according to claim 1, wherein said top portion comprising a radially inwardly extending flange, an inner diameter of said radially inwardly extending flange is less than an inner diameter of said first section of said body portion.

3. The method of making a valve stem seal according to claim 1, wherein said top portion is flush with a top of said formed rubber sealing element, an inner diameter of said top portion is equal to an inner diameter of said first section of said body portion.

4. The method of making a valve stem seal according to claim 1, wherein said second section of said body portion comprising vertical tabs, said vertical tabs are equidistance from one another and are formable so that they may be moved during or after the molding process.

5. The method of making a valve stem seal according to claim 4, wherein each of said vertical tabs comprising an inwardly extending flange.

6. The method of making a valve stem seal according to claim 1, wherein in said second state, said first section of said body portion and second section of said body portion are parallel to and in alignment with one another.

7. The method of making a valve stem seal according to claim 6, wherein an inner diameter of said first section of said body portion is substantially equal to an inner diameter of said second section of said body portion.

8. The method of making a valve stem seal according to claim 1, wherein in said second state, an inner diameter of said first section of said body portion is greater than an inner diameter of said second section of said body portion.

9. The method of making a valve stem sealing according to claim 1, wherein said top portion may be horizontally molded into the side of said formed rubber sealing element.

10. The method of making a valve stem sealing according to claim 1, wherein an inner surface of said top portion contacts an exterior surface of said rubber sealing element.

* * * * *